United States Patent [19]

Li et al.

[11] 4,172,861

[45] Oct. 30, 1979

[54] IMPACT-RESISTANT, HIGH SOFTENING MALEIC ANHYDRIDE COPOLYMERS

[75] Inventors: George S. Li, Aurora; Richard J. Jorkasky, II, Walton Hills; Gerald P. Coffey, Lyndhurst, all of Ohio

[73] Assignee: Standard Oil Company, Cleveland, Ohio

[21] Appl. No.: 882,510

[22] Filed: Mar. 1, 1978

[51] Int. Cl.$^2$ ............................................ C08F 279/02
[52] U.S. Cl. ...................................... 525/28; 526/272; 525/36
[58] Field of Search ............... 260/878 R, 880 R, 885; 526/272

[56] References Cited

U.S. PATENT DOCUMENTS

| 3,551,524 | 12/1970 | Stein | 260/878 R |
| 3,703,501 | 11/1972 | McCartney | 526/272 |
| 3,708,555 | 1/1973 | Gaylord | 260/878 R |
| 3,919,354 | 11/1975 | Moore | 260/880 R |

*Primary Examiner*—Paul R. Michl
*Attorney, Agent, or Firm*—John F. Jones; Larry W. Evans

[57] ABSTRACT

High softening thermoplastic polymeric compositions having good impact resistance are composed of polymerized maleic anhydride, a cyclic olefin such as beta-pinene, styrene, and a preformed rubber such as a styrene-butadiene rubber.

4 Claims, No Drawings

IMPACT-RESISTANT, HIGH SOFTENING MALEIC ANHYDRIDE COPOLYMERS

The present invention relates to novel polymeric compositions which have high softening temperatures and excellent resistance to impact, and more particularly pertains to such compositions which are composed of maleic anhydride, styrene, a cyclic olefin such as beta-pinene, a rubber such as a styrene-butadiene rubber, and to a process for preparing these compositions.

The novel polymeric products of this invention are prepared by polymerizing maleic anhydride, styrene, and the cyclic olefin in the presence of a rubber.

The polymeric compositions of the present invention can be prepared by any of the known general techniques of polymerization, including the bulk polymerization, solution polymerization, and emulsion or suspension polymerization techniques by batch, continuous or intermittent addition of the monomers and other components. The preferred method is solution polymerization in an organic solvent in the presence of a free-radical initiator and in the substantial absence of molecular oxygen in the temperature range of from about 0° to 100° C. Suitable solvents include methyl ethyl ketone, acetone, acetonitrile, toluene, and benzene. Most preferred solvent is methyl ethyl ketone.

The preferred polymeric compositions embodied herein are those resulting from the polymerization of 100 parts by weight of (A) from 10 to 85% by weight of styrene, (B) from 10 to 50% by weight of maleic anhydride, and (C) from 5 to 50% by weight of the cyclic olefin, wherein the sum of (A) plus (B) plus (C) is always 100%, in the presence of from 1 to 40 parts by weight of (D) a rubber selected from the group consisting of (1) a rubbery polymer of from 50 to 100% by weight of at least one member selected from the group consisting of butadiene and isoprene and from 0 to 50% by weight of at least one member selected from the group consisting of an olefinic nitrile such as acrylonitrile, an ester of an acrylic acid such as ethyl acrylate, and styrene, (2) a homopolymer of an ester of an acrylic acid such as polyethyl acrylate, (3) chlorinated butyl rubber, and (4) an ethylene-propylene rubber.

The invention can be illustrated in the polymerization of a mixture of styrene, maleic anhydride, and beta-pinene in the presence of a rubbery copolymer of styrene and butadiene in methyl ethyl ketone to produce a polymeric product having a high ASTM heat-distortion temperature and good resistance to impact.

The cyclic olefins useful in this invention include the following: beta-pinene, 5-ethylidene-2-norbornene, limonene, 2-norbornene, methylene cyclopentane, methylene cyclohexane, 5-vinyl-2-norbornene, and 5-methylene-2-norbornene.

The novel polymeric products of this invention are readily processed thermoplastic materials which can be thermoformed into a wide variety of useful articles by any of the conventional ways employed with known thermoplastic polymeric materials, such as by extrusion, milling, molding, drawing, blowing, etc., into pipes, strands, sheets, films, bottles, and the like.

In the following illustrative examples, the amounts of ingredients are expressed in parts by weight unless otherwise indicated.

EXAMPLE 1

A polymerization reactor was charged with 15 parts by weight of a styrene-butadiene (25:75) rubber, 10 parts of styrene, 25 parts of beta-pinene, and 25 parts of methyl ethyl ketone. The contents of the reactor were stirred under a blanket of nitrogen, and the temperature of the reaction mixture was raised to 70° C. with continued stirring. A uniform solution resulted.

The polymerization reaction was carried out at 70° C. over a 6-hour period with continued stirring and the continuous addition during this time of a feed composed of 40 parts of styrene, 25 parts of maleic anhydride, 0.4 part of benzoyl peroxide, and 75 parts of methyl ethyl ketone. At the end of the 6-hour reaction period, the reaction mixture was maintained at 70° C. with continued stirring for an additional hour.

The reaction mixture was cooled and the resulting resin was isolated by precipitation with methanol. After removal of the solid polymer from liquid by filtration, the polymer was dried for 48 hours at 100° C. in a vacuum oven.

The dried polymer was found to have the following properties: ASTM heat-distortion temperature (264 psi) 165° C., ASTM flexural strength $8.29 \times 10^3$ psi, ASTM flexural modulus $2.47 \times 10^5$ psi, notched Izod impact strength 2.07 foot pounds per inch of notch, and ASTM tensile strength $5.29 \times 10^3$ psi.

EXAMPLE 2

A resin which is outside the scope of this invention was prepared by the procedure of Example 1 with the exception that no rubber was included. The resulting resin was found to have the following properties: heat-distortion temperature (264 psi) 143° C., flexural strength $5.79 \times 10^3$ psi, flexural modulus $5.4 \times 10^5$ psi, notched Izod impact strength 0.19 foot pounds per inch of notch, and tensile strength $4.08 \times 10^3$ psi.

EXAMPLE 3

The procedure of Example 1 was followed. The polymerization reactor was charged initially with 15 parts of styrene-butadiene rubber, 10 parts of styrene, 30 parts of beta-pinene, 25 parts of toluene, and 50 parts of methyl ethyl ketone. The solution and polymerization steps were carried out at 80° C. The feed mixture was composed of 20 parts of styrene, 40 parts of maleic anhydride, 0.4 part of benzoyl peroxide, and 50 parts of methyl ethyl ketone. The feed was added to the reaction mixture uniformly over a period of 8 hours. At this time, an additional 15 parts of methyl ethyl ketone were added to the rather viscous reaction mixture and stirring and heating were continued for another hour. The polymer was isolated by the procedure given in Example 1.

The resulting polymer was found to have the following properties: heat-distortion temperature (264 psi) 157° C., flexural strength $9.71 \times 10^3$ psi, flexural modulus $2.53 \times 10^5$ psi, notched Izod impact strength 1.13 foot pounds per inch of notch, and tensile strength $6.28 \times 10^3$ psi.

EXAMPLE 4

A polymer was prepared from 40 parts of styrene, 30 parts of maleic anhydride, 30 parts of beta-pinene, and 15 parts of styrene-butadiene rubber by the procedure described in Example 3. The continuous feed was composed of 30 parts of styrene, 30 parts of maleic anhydride, 0.4 part of benzoyl peroxide, and 50 parts of methyl ethyl ketone. The reaction temperature was 82° C.

The resulting polymer was found to have the following properties: heat-distortion temperature (264 psi) 159° C., flexural strength $8.25 \times 10^3$ psi, flexural modulus $2.72 \times 10^5$ psi, notched Izod impact strength 1.13 foot pounds per inch of notch, and tensile strength $5.87 \times 10^3$ psi.

EXAMPLE 5

A polymer was prepared from 60 parts of styrene, 20 parts of maleic anhydride, 20 parts of beta-pinene, and 15 parts of styrene-butadiene rubber by the procedure of Example 3 with the following exceptions.

The initial reactor charge was composed of 15 parts of styrene-butadiene rubber, 8 parts of styrene, 25 parts of toluene, 50 parts of methyl ethyl ketone, and 20 parts of beta-pinene. The continuous feed was composed of 52 parts of styrene, 20 parts of maleic anhydride, 0.4 part of benzoyl peroxide, and 50 parts of methyl ethyl ketone. The reaction temperature was 80° C.

The resulting polymer was found to have the following properties: heat-distortion temperature (264 psi) 157° C., flexural strength $8.24 \times 10^3$ psi, flexural modulus $2.61 \times 10^5$ psi, notched Izod impact strength 1.96 foot pounds per inch of notch, and tensile strength $5.00 \times 10^3$ psi.

EXAMPLE 6

A polymer was prepared from 10 parts of styrene, 45 parts of maleic anhydride, 45 parts of 5-ethylidene-2-norbornene, and 15 parts of styrene-butadiene rubber by the procedure of Example 3 with the following exceptions.

The initial reactor charge was composed of 15 parts of the styrene-butadiene rubber, 45 parts of 5-ethylidene-2-norbornene, 10 parts of styrene, 25 parts of toluene, and 25 parts of methyl ethyl ketone. The continuous feed was composed of 45 parts of maleic anhydride, 0.4 part of benzoyl peroxide, and 50 parts of methyl ethyl ketone. The reaction temperature was 81° C.

The resulting polymer was found to have the following properties: heat-distortion temperature (264 psi) 145° C., flexural strength $5.80 \times 10^3$ psi, flexural modulus $2.86 \times 10^5$ psi, notched Izod impact strength 0.75 foot pounds per inch of notch, and tensile strength $4.21 \times 10^3$ psi.

EXAMPLE 7

A polymer was prepared from 50 parts of styrene, 23 parts of maleic anhydride, 27 parts of limonene, and 15 parts of styrene-butadiene rubber. The procedure of Example 3 was generally followed. The initial reactor charge was composed of 15 parts of rubber, 50 parts of styrene, and 50 parts of methyl ethyl ketone. After solution occurred at 83.5° C., 0.2 part of benzoyl peroxide was added. The continuous feed which was composed of 23 parts of maleic anhydride, 27 parts of limonene, and 25 parts of methyl ethyl ketone was added over a 6-hour period.

The resulting polymer was found to have the following properties: heat-distortion temperature (264 psi) 150° C., flexural strength $6.27 \times 10^3$ psi, flexural modulus $2.74 \times 10^5$ psi, notched Izod impact strength 0.81 foot pounds per inch of notch, and tensile strength $5.00 \times 10^3$ psi.

EXAMPLE 8

A polymer was prepared from 50 parts of styrene, 23 parts of maleic anhydride, 27 parts of 2-norbornene, and 15 parts of styrene-butadiene rubber by the procedure of Example 7 except that 2-norbornene was used in place of limonene.

The resulting polymer was found to have the following properties: heat-distortion temperature (264 psi) 146° C., flexural strength $8.12 \times 10^3$ psi, flexural modulus $2.87 \times 10^5$ psi, notched Izod impact strength 0.94 foot pounds per inch of notch, and tensile strength $5.22 \times 10^3$ psi.

We claim:

1. The resinous polymer composition resulting from the polymerization of 100 parts by weight of
    (A) from 10 to 85% by weight of styrene,
    (B) from 10 to 50% by weight of maleic anhydride, and
    (C) from 5 to 50% by weight of a member selected from the group consisting of beta-pinene, limonene, methylene cyclopentane, and methylene cyclohexane, wherein the sum of (A) plus (B) plus (C) is always 100%,
in the presence of from 1 to 40 parts by weight of
    (D) a rubber selected from the group consisting of
        (1) a rubbery polymer of from 50 to 100% by weight of at least one member selected from the group consisting of butadiene and isoprene and from 0 to 50% by weight of at least one member selected from the group consisting of an olefinic nitrile, an ester of an acrylic acid, and styrene,
        (2) a homopolymer of an ester of an acrylic acid,
        (3) chlorinated butyl rubber, and
        (4) an ethylene-propylene rubber.

2. The polymer of claim 1 wherein (C) is beta-pinene.

3. The process comprising polymerizing in an organic solvent in the presence of a free-radical initiator and in the substantial absence of molecular oxygen in the temperature range of from about 0° to 100° C. 100 parts by weight of
    (A) from 10 to 85% by weight of styrene,
    (B) from 10 to 50% by weight of maleic anhydride, and
    (C) from 5 to 50% by weight of a member selected from the group consisting of beta-pinene, limonene, methylene cyclopentane, and methylene cyclohexane, wherein the sum of (A) plus (B) plus (C) is always 100%,
in the presence of from 1 to 40 parts by weight of
    (D) a rubber selected from the group consisting of
        (1) a rubbery polymer of from 50 to 100% by weight of at least one member selected from the group consisting of butadiene and isoprene and from 0 to 50% by weight of at least one member selected from the group consisting of an olefinic nitrile, an ester of an acrylic acid, and styrene,
        (2) a homopolymer of an ester of an acrylic acid,
        (3) chlorinated butyl rubber, and
        (4) an ethylene-propylene rubber.

4. The process of claim 3 wherein (C) is beta-pinene.

* * * * *